United States Patent
Sasaki et al.

(10) Patent No.: US 10,058,178 B2
(45) Date of Patent: Aug. 28, 2018

(54) RECLINING DEVICE

(71) Applicant: Shiroki Corporation, Fujisawa-shi (JP)

(72) Inventors: Kazutaka Sasaki, Fujisawa (JP);
Nobumasa Higashi, Fujisawa (JP);
Noriyuki Zaiki, Fujisawa (JP);
Munetomo Kumamoto, Fujisawa (JP)

(73) Assignee: SHIROKI CORPORATION,
Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/419,706

(22) Filed: Jan. 30, 2017

(65) Prior Publication Data
US 2018/0213936 A1 Aug. 2, 2018

(51) Int. Cl.
| B60N 2/20 | (2006.01) |
| A47C 1/024 | (2006.01) |
| B60N 2/22 | (2006.01) |
| B60N 2/02 | (2006.01) |
| B60N 2/10 | (2006.01) |
| B60N 2/36 | (2006.01) |

(52) U.S. Cl.
CPC ............... *A47C 1/024* (2013.01); *B60N 2/20* (2013.01); *B60N 2/2227* (2013.01)

(58) Field of Classification Search
CPC ............................. B60N 2/20; B60N 2/2227
USPC ........................................ 297/378.12, 378.14
See application file for complete search history.

(56) References Cited

U.S. PATENT DOCUMENTS

| 5,788,330 | A | * | 8/1998 | Ryan | B60N 2/2354 297/378.12 X |
| 6,139,104 | A | * | 10/2000 | Brewer | B60N 2/20 297/378.12 X |
| 6,161,899 | A | * | 12/2000 | Yu | B60N 2/01583 297/378.12 |
| 6,199,953 | B1 | * | 3/2001 | Chen | B60N 2/232 297/378.12 X |
| 6,290,297 | B1 | * | 9/2001 | Yu | B60N 2/01583 297/378.12 |
| 6,511,129 | B1 | * | 1/2003 | Minor | B60N 2/2352 297/378.12 X |
| 6,634,714 | B1 | * | 10/2003 | Pejathaya | B60N 2/206 297/397.12 X |
| 7,328,954 | B2 | * | 2/2008 | Sasaki | B60N 2/12 297/378.12 X |
| RE41,964 | E | * | 11/2010 | Hellrung | B60N 2/01583 297/378.12 X |

(Continued)

FOREIGN PATENT DOCUMENTS

JP 4917389 B2 4/2012

*Primary Examiner* — Rodney B White
(74) *Attorney, Agent, or Firm* — McGinn I.P. Law Group, PLLC.

(57) ABSTRACT

A reclining device includes: a reclining mechanism, which is capable of tilting of a seat back relative to a seat cushion to be locked or unlocked; a hinge pin, which is engaged with the reclining mechanism and configured to cause the reclining mechanism to be in an unlocked state; a first biasing member, one end of which is hooked to a hooking part provided at a seat-cushion-side member; and a second biasing member, one end of which is engaged to a periphery of an engagement part formed at the hinge pin and the other end of which is hooked to the seat-cushion-side member, wherein a vertical cross-section of the engagement part of the hinge pin has a non-circular shape.

20 Claims, 4 Drawing Sheets

(56) References Cited

U.S. PATENT DOCUMENTS

| | | | | |
|---|---|---|---|---|
| 7,871,127 B2* | 1/2011 | Bruck | ............... | B60N 2/20 |
| | | | | 297/378.1 |
| 9,868,369 B1* | 1/2018 | Aktas | ............... | B60N 2/20 |
| 2012/0248841 A1* | 10/2012 | Hellrung | ............... | B60N 2/20 |
| | | | | 297/354.1 |
| 2012/0261964 A1* | 10/2012 | Yamaguchi | ............... | B60N 2/12 |
| | | | | 297/378.14 |
| 2018/0015849 A1* | 1/2018 | Mahadik | ............... | B60N 2/20 |

* cited by examiner

RECLINING DEVICE

TECHNICAL FIELD

This disclosure relates to a reclining device with which a reclining seat is equipped.

BACKGROUND

In the related art, a seat provided with a reclining mechanism has, for example, a plurality of biasing members such as a biasing member for biasing a seat back in a forwardly inclined direction, a biasing member for biasing an operating lever of the reclining mechanism in a locking direction, and so on (see Japanese Patent No. 4917389).

SUMMARY

In the seat disclosed in Japanese Patent No. 4917389, a part of the biasing members is engaged with an operating shaft (a hinge pin), and a slotted part in which the biasing member is locked is formed in an end of the operating shaft. For this reason, to secure strength required for the operating shaft, there is a need to increase a diameter of the operating shaft, so that the reclining mechanism is enlarged. Since the slotted part is formed, it is difficult to mount another member on the end of the operating shaft.

This disclosure provides a reclining device capable of reducing a diameter of a hinge pin and mounting another member on an end of the hinge pin.

According to one aspect of this disclosure, a reclining device includes: a reclining mechanism, which is capable of tilting of a seat back relative to a seat cushion to be locked or unlocked; a hinge pin, which is engaged with the reclining mechanism and configured to cause the reclining mechanism to be in an unlocked state; a first biasing member, one end of which is hooked to a hooking part provided at a seat-cushion-side member, and the other end of which is hooked to a seat-back-side member, and a second biasing member, one end of which is engaged to a periphery of an engagement part formed at the hinge pin and the other end of which is hooked to the seat-cushion-side member, wherein a vertical cross-section of the engagement part of the hinge pin has a non-circular shape.

According to the above configuration, a non-circular engagement part is formed at the hinge pin engaged with the reclining mechanism, but a slit for locking the second biasing member is not formed. For this reason, in comparison with a hinge pin in which a slit is formed, it is possible to sufficiently secure strength and reduce a diameter of the hinge pin. The second biasing member can be reliably locked to the engagement part of the hinge pin. Since no slit is formed in an end of the hinge pin, for example another member can be easily mounted to the end of the hinge pin.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an example of the present embodiment will be described with reference to the drawings.

A reclining device of this disclosure is applied to, for example, a reclining seat of a vehicle.

The reclining device is provided at opposite sides of the reclining seat. The reclining seat is provided with a seat cushion that supports buttocks of a seated person, and a seat back that supports a back of the seated person. The seat cushion and the seat back are mounted via the reclining device. The seat back is provided to be tiltable with respect to the seat cushion.

Figure 1:
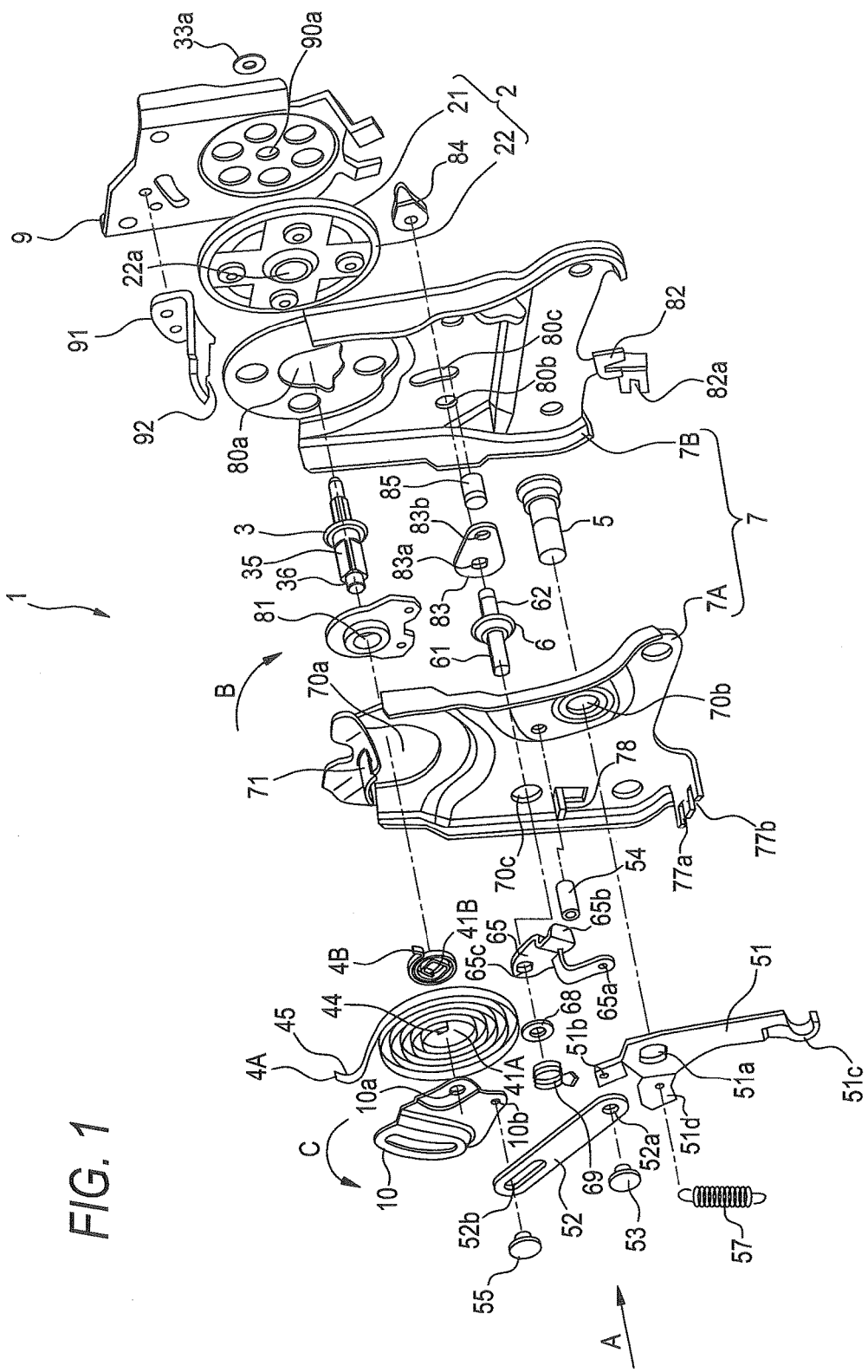
FIG. 1 is an exploded perspective view of main parts of a reclining device according to an embodiment of this disclosure.
Figure 2:
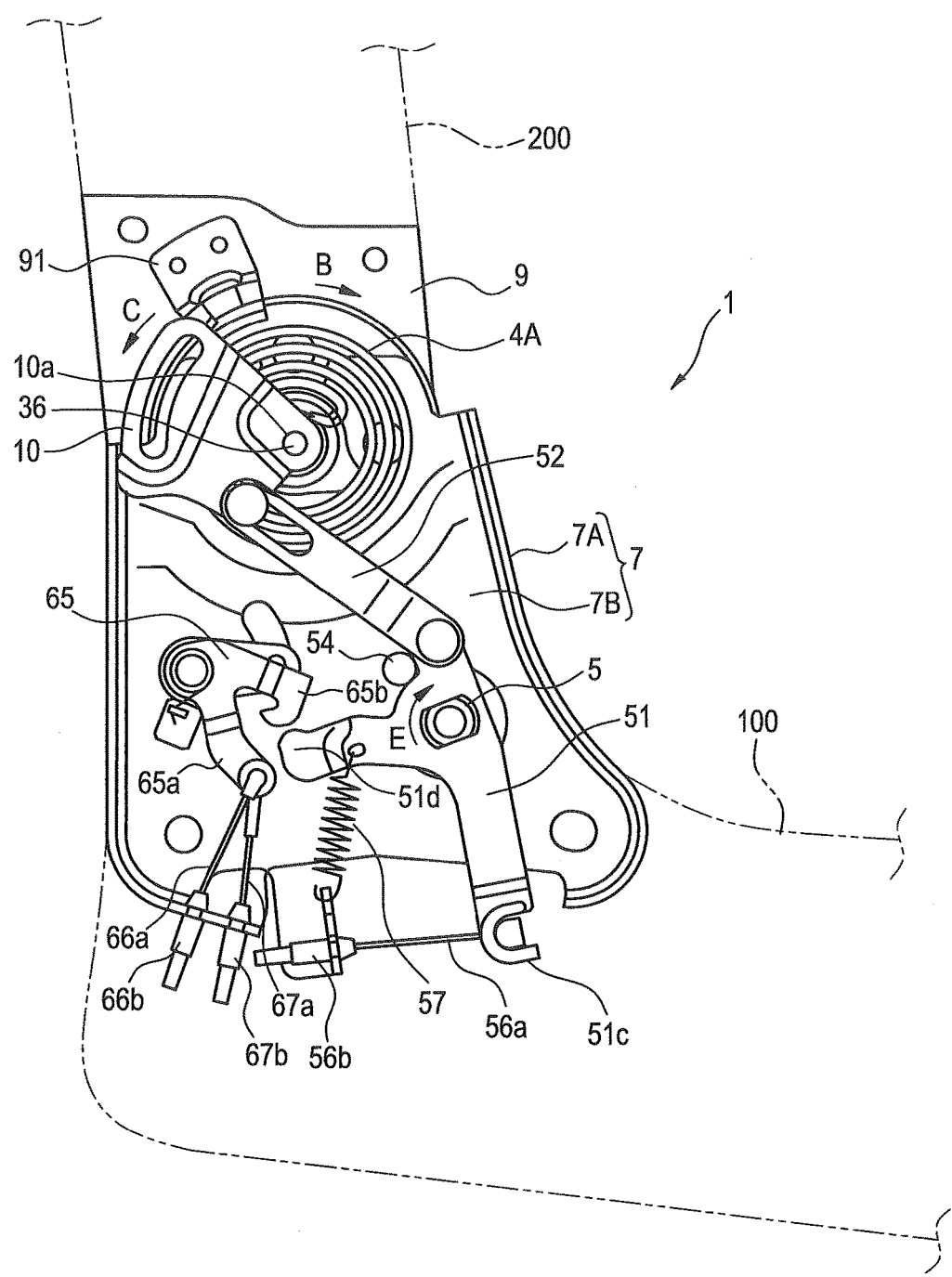
FIG. 2 is a right side view of the reclining device when viewed in a direction A of FIG. 1.

As illustrated in FIGS. 1 and 2, the reclining device 1 is provided with a reclining mechanism 2 that can lock or unlock a tilt of a seat back 200 relative to a seat cushion 100.

The reclining mechanism 2 has a first member 21 and a second member 22 that can rotate relative to the first member 21. The first member 21 is configured such that one surface thereof becomes an open surface and internal teeth (not shown) are formed in a circumferential direction. A plurality of pawls are disposed in the first member 21. External teeth (not shown) meshed with internal teeth of the first member 21 are formed on the pawls. The second member 22 is stacked at the open surface side of the first member 21, and can be rotated relative to the first member 21 in the circumferential direction. Guides for guiding the respective pawls are formed on the second member 22 between a locking position at which the external teeth of the pawls are meshed with the internal teeth of the first member 21 and an unlocking position at which the external teeth are separated from the internal teeth.

The reclining mechanism 2 has a cam mechanism that is rotatably provided on an axis of relative rotation between the first member 21 and the second member 22. The cam mechanism displaces pawls (not shown) in a direction in which the external teeth of the pawls are meshed with the internal teeth of the first member 21 when rotated in one direction, and in a direction in which the external teeth are separated from the internal teeth when rotated in the other direction. In addition, the reclining mechanism 2 has a spring (not shown) that directly or indirectly biases each of the pawls in the direction in which the external teeth of the pawls are meshed with the internal teeth of the first member 21.

This reclining mechanism 2 is in a locked state in which the external teeth of the pawls are typically meshed with the internal teeth of the first member 21 by a biasing force of the spring and the relative rotation between the first member 21 and the second member 22 is not allowed. When the cam mechanism is operated against the biasing force of the spring to displace the pawls in the direction in which the external teeth are separated from the internal teeth, the reclining mechanism 2 is in an unlocked state in which the relative rotation between the first member 21 and the second member 22 is allowed.

The reclining mechanism 2 is disposed between a lower arm 7 (seat-cushion-side member) provided at the seat cushion 100 side and an upper arm 9 provided at the seat back 200 side. The lower arm 7 has a first lower arm 7A and a second lower arm 7B stacked on the first lower arm 7A in a width direction of the reclining seat. The reclining mechanism 2 is configured such that the first member 21 is mounted on the upper arm 9 and the second member 22 is mounted on the second lower arm 7B of the lower arm 7. The second lower arm 7B and the upper arm 9 are mounted via the reclining mechanism 2, and the reclining mechanism 2 is in the unlocked state. Thereby, the upper arm 9 can be tilted with respect to the lower arm 7 (7A, 7B) in a forward/backward direction.

A hole 70a through which the axis of relative rotation of the reclining mechanism 2 passes is formed in the first lower arm 7A, and the corresponding hole 80a is formed in the second lower arm 7B. A cover 81 is mounted on the second lower arm 7B such that the hole 80a is covered. A first hinge pin 3 (an example of a hinge pin) installed on the axis of relative rotation is rotatably supported on the cover 81.

Figure 3:
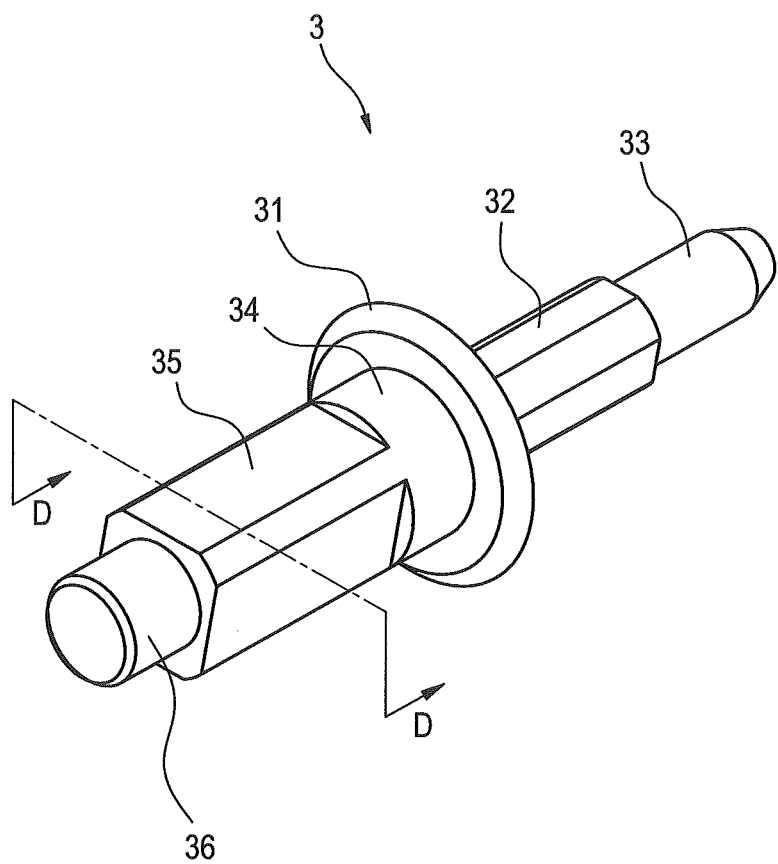
FIG. 3 is an enlarged perspective view of a third axial hinge pin of FIG. 1.

As illustrated in FIGS. 1 and 3, a large diameter part 31 is formed in the middle of the first hinge pin 3. The large diameter part 31 comes into contact with the cover 81, thereby positioning one side of the first hinge pin 3 in an axial direction.

An polygonal part 32 whose vertical sectional shape is an polygonal shape is formed at one side of the first hinge pin 3 with respect to the large diameter part 31 of the first hinge pin 3. The polygonal part 32 is inserted into the hole 70a of the first lower arm 7A and the hole 80a of the second lower arm 7B, and is connected to the cam mechanism inside the reclining mechanism 2 via a hole 22a formed in the center of the second member 22 of the reclining mechanism 2. The first hinge pin 3 is engaged with the reclining mechanism 2 and operates the cam mechanism, so that the reclining mechanism 2 is in the unlocked state.

A small diameter part 33 is formed at the above-described one side to be continuous with the polygonal part 32. The small diameter part 33 is rotatably supported in a hole 90a of the upper arm 9. A washer 33a for preventing pullout in an axial direction is mounted on an end of the small diameter part 33 protruding from the hole 90a of the upper arm 9.

A medium diameter part 34 rotatably supported on the cover 81 is formed at the other side of the first hinge pin 3 with respect to the large diameter part 31 of the first hinge pin 3.

A engagement part 35 is formed at the other side to be continuous with to the medium diameter part 34. The engagement part 35 is formed such that the shape of a vertical section (a section D-D) becomes a non-circular shape. For example, the engagement part 35 is formed in such a shape that at least one flat surface is formed on an outer circumferential surface of the first hinge pin 3. Additionally, the one flat surface may be formed with a various form such as a tooth form. For example, the engagement part 35 is formed in such a shape that the vertical section of the first hinge pin 3 has any one of a polygonal shape and a quadrilateral shape. In the present example, the engagement part 35 is formed to have an approximately quadrilateral shape.

A attachment part 36 is formed at the other side to be continuous with the engagement part 35.

A first spiral spring 4A (an example of the first biasing member) and a second spiral spring 4B (an example of the second biasing member) having a smaller diameter than the first spiral spring 4A are provided around the engagement part 35. The first spiral spring 4A and the second spiral spring 4B are separated from each other in the axial direction of the first hinge pin 3. The second spiral spring 4B is disposed at a side closer to the large diameter part 31 of the first hinge pin 3 than the first spiral spring 4A. That is, the second spiral spring 4B is disposed between the first spiral spring 4A and the reclining mechanism 2.

Figure 4:
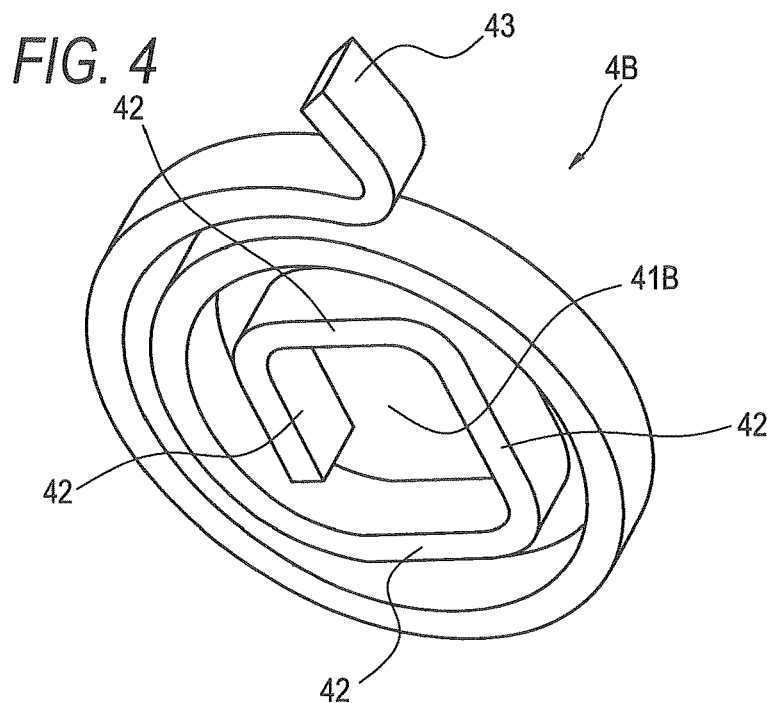
FIG. 4 is an enlarged perspective view of a second biasing member of FIG. 1.

As illustrated in FIGS. 1 and 4, the second spiral spring 4B of the present example is formed such that a quadrilateral space 41B is made on the inside thereof. This space 41B is formed to have a quadrilateral shape with approximately the same size as the shape of the engagement part 35 of the first hinge pin 3. The second spiral spring 4B disposed around the first hinge pin 3 is configured such that an inner end 42 thereof is to engage to the engagement part 35 of the first hinge pin 3. A bent part 43 that can be engaged to another member is formed at an outer end of the second spiral spring 4B.

A space 41A having a larger size than the engagement part 35 of the first hinge pin 3 is formed inside the first spiral spring 4A (see FIG. 1). Bent parts 44 and 45 that can be engaged to other members are respectively formed at inner and outer ends of the first spiral spring 4A (see FIG. 1).

Figure 5:
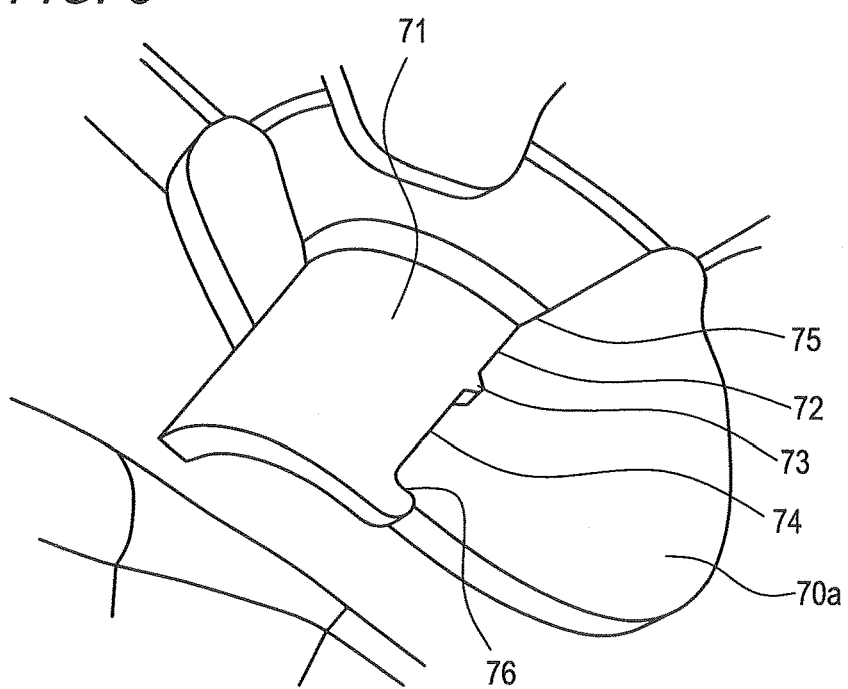
FIG. 5 is an enlarged perspective view of a hooking part of FIG. 1.

As illustrated in FIGS. 1 and 5, a hooking part 71 is formed at a periphery of the hole 70a of the first lower arm 7A. The hooking part 71 is formed on a surface of the first lower arm 7A, which does not face the second lower arm 7B, to extend in the same direction as the first hinge pin 3.

A first hooking part 72, a protrusion part 73, and a second hooking part 74 are formed at one side of the hooking part 71. The first hooking part 72 is formed at a side close to the surface of the first lower arm 7A (at a base end side of the hooking part 71). The second hooking part 74 is formed at a side distant from the surface of the first lower arm 7A (at a front end side of the hooking part 71). The protrusion part 73 is formed between the first hooking part 72 and the second hooking part 74 to separate the first hooking part 72 and the second hooking part 74 from each other in the axial direction of the first hinge pin 3. The first hooking part 72 is defined by the protrusion part 73 and a sidewall 75 of a base end side of the hooking part 71. The second hooking part 74 is defined by the protrusion part 73 and a sidewall 76 of a front end side of the hooking part 71.

A hooking part 91 extending in the same direction as the hooking part 71 of the first lower arm 7A is mounted on a surface of the upper arm 9 which faces the second lower arm 7B (see FIG. 1). A recess part 92 to which the biasing member is hooked is formed at a lateral portion of the hooking part 91.

The bent part 43 formed at the outer end of the second spiral spring 4B is hooked to the first hooking part 72 of the hooking part 71 formed at the first lower arm 7A. In addition, the bent part 44 formed at the inner end of the first spiral spring 4A is hooked to the second hooking part 74 of the hooking part 71. The bent part 45 formed at the outer end of the first spiral spring 4A is hooked to the recess part 92 of the hooking part 91 formed at the upper arm 9.

The inner end 42 of the second spiral spring 4B is engaged to the engagement part 35 of the first hinge pin 3 and the the bent part 43 at the outer end is hooked to the hooking part 71 of the first lower arm 7A, so that the first hinge pin 3 is biased by a biasing force of the second spiral spring 4B, in a direction in which there is no backlash between the spiral spring 4B and the reclining mechanism 2 (in a direction indicated by arrow B in FIG. 1, which is a locking direction in this embodiment).

The bent part 44 at the inner end of first spiral spring 4A is hooked to the hooking part 71 of the first lower arm 7A and the bent part 45 at the outer end of which is hooked to the hooking part 91 of the upper arm 9, so that the upper arm 9 is biased by a biasing force of the first spiral spring 4A, in a forwardly tilting direction (in the direction indicated by arrow B in FIG. 1).

As illustrated in FIG. 1, an open lever 10 (an example of the operating member) for operating the reclining mechanism 2 is mounted on the attachment part 36 of the first hinge pin 3. The attachment part 36 is fixed to a hole 10a, which is formed in the open lever 10 by caulking, for example. When the open lever 10 is rotated in a direction indicated by arrow C in FIG. 1, the cam mechanism inside the reclining mechanism 2 is rotated via the first hinge pin 3, the reclining mechanism 2 in the locked state is unlocked, and thus the upper arm 9 is tilted forward with respect to the lower arm 7.

A walk-in lever 51 disposed at the surface side of the first lower arm 7A which does not face the second lower arm 7B is rotated along with walk-in operation. The walk-in lever 51 is fixed to the second hinge pin 5 fitted into a hole 51a formed in a middle portion of the walk-in lever 51. The second hinge pin 5 is rotatably fitted into a hole 70b formed in the first lower arm 7A. Thereby, the walk-in lever 51 is provided to be rotatable relative to the first lower arm 7A.

A connecting rod 52 is attached on one end of the walk-in lever 51. The walk-in lever 51 and the connecting rod 52 are rotatably attached by a pin 53, which is inserted into a hole 52a formed in one end of the connecting rod 52 and a hole 51b formed in the one end of the walk-in lever 51.

The open lever 10 is connected to the connecting rod 52. The connecting rod 52 and the open lever 10 are connected by a pin 55 that is inserted into a long hole 52b formed in the other end of the connecting rod 52 and a hole 10b formed in the open lever 10.

An inner cable 56a (see FIG. 2) is connected to the other end 51c of the walk-in lever 51. The inner cable 56a is adapted to be pulled when a seated person performs lever operation (walk-in operation) when riding on or getting off a vehicle. An outer tube 56b attached on the inner cable 56a is hooked to a cutout groove 82a of a bracket part 82 formed at a lower portion of the second lower arm 7B. The other end of the spring 57, one end of which is hooked to the bracket part 82, is hooked to an arm part 51d formed at a lateral portion of the walk-in lever 51. The walk-in lever 51 causes the inner cable 56a to be biased by the spring 57 in a direction in which the inner cable 56a is pulled. Additionally, a rotation due to the biasing of the walk-in lever 51 is restricted by a stopper 54 fixed to the first lower arm 7A (an initial position).

An operating lever 65 is disposed at the surface side of the first lower arm 7A which does not face the second lower arm 7B, namely at which the walk-in lever 51 is provided. The operating lever 65 has a first arm part (a fastener part) 65a and a second arm part (a pressing arm part) 65b.

An inner cable 66a and an inner cable 67a are connected to the first arm part 65a (see FIG. 2). An outer tube 66b of the inner cable 66a is locked to a locking groove 77a formed in the first lower arm 7A, and an outer tube 67b of the inner cable 67a is locked to a locking groove 77b formed in the first lower arm 7A.

A third hinge pin 6 is attached on the first lower arm 7A and the second lower arm 7B. The third hinge pin 6 is inserted into a hole 70c formed in the first lower arm 7A and a hole 80b formed in the second lower arm 7B, and is provided to be rotatable relative to the lower arm 7. The third hinge pin 6 is disposed to be parallel to a center axis of tilting of the upper arm 9.

An oval part 61, a sectional shape of which is an oval shape, is formed at one end of the third hinge pin 6. The oval part 61 is fitted into an oval hole 65c formed in the operating lever 65. Thereby, the operating lever 65 and the third hinge pin 6 are rotated in one body.

A washer 68 to suppress pullout and an inner end of a spring 69 are attached to a front end of the oval part 61 of the third hinge pin 6 fitted to the hole 65c of the operating lever 65. An outer end of the spring 69 is hooked to a hooking part 78 formed in the first lower arm 7A. Due to this spring 69, the operating lever 65 is biased in a direction in which the second arm part 65b approaches the arm part 51d of the walk-in lever 51.

An oval part 62, a sectional shape of which is an oval shape, is formed at the other end of the third hinge pin 6. The oval part 62 is fitted into a hole 83a formed at one end side of a stopper lever 83 disposed between the first lower arm 7A and the second lower arm 7B. A tip of the oval part 62 is inserted into a hole 80b of the second lower arm 7B, and is projected to the outside of the lower arm 7. A rotation propulsion lever 84 is attached on the projected tip of the oval part 62.

A hole 83b is formed at the other end side of the stopper lever 83. A stopper pin 85 extending in a direction intersecting a rotating plane of the stopper lever 83 is attached to this hole 83b. The stopper pin 85 is inserted into an arc-like long hole 80c formed in the second lower arm 7B, and is projected to the outside of the lower arm 7.

Thereby, the operating lever 65, the rotation propulsion lever 84, and the stopper lever 83 are rotatable integrally with the third hinge pin 6.

Next, an operation of the reclining device 1 will be described with reference to FIG. 2.

In the reclining device 1 illustrated in FIG. 2, a state in which the reclining mechanism 2 is locked is illustrated. The first hinge pin 3 is biased by a biasing force of the second spiral spring 4B in a direction in which there is no backlash between the spiral spring 4B and the reclining mechanism 2 (in a direction indicated by arrow B). The upper arm 9 is biased by a biasing force of the first spiral spring 4A in a forwardly tilting direction (in the direction indicated by arrow B).

(Walk-in Operation)

When the operating lever is operated (during a walk-in operation) from a state of FIG. 2, for example, when a seated person rides on or gets off a vehicle, the inner cable 56a is pulled against a biasing force of the spring 57, and the walk-in lever 51 is rotated in a clockwise direction (in a direction indicated by arrow E).

When the walk-in lever 51 is rotated, the open lever 10 is rotated via the connecting rod 52 in a direction indicated by arrow C. When the open lever 10 is rotated, the first hinge pin 3 connected to the open lever 10 is rotated against a biasing force of the second spiral spring 4B in the direction indicated by arrow C like the open lever 10. When the first hinge pin 3 is rotated, the cam mechanism inside the reclining mechanism 2 is rotated, and the reclining mechanism 2 is unlocked.

When the walk-in lever 51 is rotated, the arm part 51d thereof presses the second arm part 65b of the operating lever 65. The operating lever 65 pulls the inner cable 66a and the inner cable 67a, and a lock mechanism of right and left slide rails is unlocked.

As the reclining mechanism 2 is unlocked, the upper arm 9 begins to be tilted forward by a biasing force of the first spiral spring 4A.

(Normal Reclining Operation)

When an unlocking lever (not shown) of reclining is operated, only the open lever 10 is rotated in a direction indicated by arrow C.

As the open lever 10 rotates, the first hinge pin 3 is rotated in the same way as described above, and the reclining mechanism 2 is unlocked. Thereby, the upper arm 9 begins to be tilted forward by a biasing force of the first spiral spring 4A.

According to the reclining device 1 of the above configuration, the engagement part 35, a sectional shape of which is an approximately quadrilateral shape, is formed at the first hinge pin 3 engaged with the cam mechanism in the reclining mechanism 2 in order to engage the second spiral spring 4B. For this reason, in comparison with, for example, a hinge pin, in an end of which a slit is formed to hook the second spiral spring 4B, the first hinge pin 3 can sufficiently secure strength, and a diameter thereof can be made small. The second spiral spring 4B can be reliably engaged by the quadrilateral engagement part 35 of the first hinge pin 3. Since no slit is formed in the end of the first hinge pin 3, another member such as, for example, the open lever 10 can be easily mounted on the end of the first hinge pin 3.

The second spiral spring 4B is formed such that the quadrilateral space 41B is made on the inside thereof. For this reason, the inner end 42 inside the second spiral spring 4B can be reliably engaged by the quadrilateral engagement part 35 of the first hinge pin 3, and the biasing force of the second spiral spring 4B can be applied to the first hinge pin 3 without a loss.

The first hooking part 72 to hook the second spiral spring 4B, the second hooking part 74 to hook the first spiral spring 4A, and the protrusion part 73 to separate the first hooking part 72 from the second hooking part 74 are formed at the hooking part 71 provided for the first lower arm 7A. Accordingly, contact (interference) between the first spiral spring 4A and the second spiral spring 4B can be suppressed, and the first spiral spring 4A and the second spiral spring 4B can make the respective functions by exerting no influence to each other's biasing forces.

The first hooking part 72 is defined by the protrusion part 73 and the sidewall 75 of the proximal end side of the hooking part 71, and the second hooking part 74 is defined by the protrusion part 73 and the sidewall 76 of the distal end side of the hooking part 71. For this reason, positions of the first spiral spring 4A and the second spiral spring 4B can be properly set in the axial direction of the first hinge pin 3 by the protrusion part 73 and the sidewalls 75 and 76.

The second spiral spring 4B is disposed between the first spiral spring 4A and the reclining mechanism 2 in the axial direction of the first hinge pin 3. Since the second spiral spring 4B is disposed at the reclining mechanism 2 side relative to the first spiral spring 4A, the biasing force of the second spiral spring 4B can be efficiently applied to the reclining mechanism 2 via the first hinge pin 3. Since the positions of the first and second spiral springs 4A and 4B for a position of the reclining mechanism 2 are different in the axial direction of the first hinge pin 3, it is difficult to cause interference between each of the biasing members and another member during forward tilting of the seat back, and a degree of freedom of design is improved.

This disclosure is not limited to the above embodiment, and modification, improvement, etc. thereof are made appropriately. In addition, a material, a shape, dimensions, a numerical value, a form, a number, a disposed place, etc. of each component in the above embodiment are arbitrary as long as this disclosure can be achieved, and are not limited.

What is claimed is:

1. A reclining device, comprising:
    a reclining mechanism, which is capable of tilting of a seat back relative to a seat cushion to be locked or unlocked;
    a hinge pin, which is engaged with the reclining mechanism and is configured to cause the reclining mechanism to be in an unlocked state;
    a first biasing member, a first end of the first biasing member is hooked to a hooking part provided at a seat-cushion-side member and a second end of the first biasing member is hooked to a seat-back-side member to bias the seat back in a direction in which the seat back is tilted forward toward the seat cushion; and
    a second biasing member, a first end of the second biasing member is engaged to a periphery of an engagement part formed at the hinge pin and a second end of the second biasing member is hooked to the seat-cushion-side member, and which is configured to bias the hinge pin in a direction in which there is no backlash between the hinge pin and the reclining mechanism,
    wherein a vertical cross-section of the engagement part of the hinge pin has a non-circular shape.

2. The reclining device according to claim 1, wherein the vertical cross-section of the engagement part of the hinge pin has a polygonal shape.

3. The reclining device according to claim 1, wherein the vertical cross-section of the engagement part of the hinge pin has a quadrilateral shape.

4. The reclining device according to claim 1, wherein an outer circumferential surface of the engagement part of the hinge pin includes at least one flat surface.

5. The reclining device according to claim 1, wherein the second biasing member includes a spiral spring, and
    wherein an inner end of the spiral spring is engaged to the engagement part of the hinge pin.

6. The reclining device according to claim 1, wherein an operating member for operating the reclining mechanism is mounted on an end of the hinge pin.

7. The reclining device according to claim 1, wherein the first biasing member and the second biasing member are disposed to be separated from each other in an axial direction of the hinge pin, and
    wherein a protrusion part is formed to separate a first hooking part, to which the first end of the first biasing member is hooked, and a second hooking part, to which the second end of the second biasing member is hooked, in the axial direction of the hinge pin, at the hooking part.

8. The reclining device according to claim 7, wherein the first hooking part is defined by the protrusion part disposed at a first side of the first end of the first biasing member and a first sidewall disposed at a second side of the first end of the first biasing member, and
    wherein the second hooking part is defined by the protrusion part disposed at a first side of the second end of the second biasing member and a second sidewall disposed at a second side of the second end of the second biasing member.

9. The reclining device according to claim 1, wherein the second biasing member is disposed between the first biasing member and the reclining mechanism in the axial direction of the hinge pin.

10. The reclining device according to claim 1, wherein the second biasing member biases the hinge pin in a locking direction.

11. The reclining device according to claim 1, wherein the first biasing member and the second biasing member are disposed to be separated from each other.

12. The reclining device according to claim 11, wherein a protrusion part is formed to separate a first hooking part, to which the first end of the first biasing member is hooked, and a second hooking part, to which the second end of the second biasing member is hooked.

13. The reclining device according to claim 1, wherein the first biasing member and the second biasing member are disposed to be separated from each other in an axial direction of the hinge pin.

14. The reclining device according to claim 1, wherein a protrusion part separates a first hooking part, to which the first end of the first biasing member is hooked, and a second hooking part, to which the second end of the second biasing member is hooked.

15. The reclining device according to claim 1, wherein a protrusion part separates a first hooking part, to which the first end of the first biasing member is hooked, and a second hooking part, to which the second end of the second biasing member is hooked, in an axial direction of the hinge pin, at the hooking part.

16. The reclining device according to claim 15, wherein the first hooking part is defined by the protrusion part disposed at a first side of the first end of the first biasing member and a first sidewall disposed at a second side of the first end of the first biasing member.

17. The reclining device according to claim 15, wherein the second hooking part is defined by the protrusion part disposed at a first side of the second end of the second biasing member and a second sidewall disposed at a second side of the second end of the second biasing member.

18. The reclining device according to claim 1, wherein a protrusion part separates a first hooking part and a second hooking part, the first hooking part being defined by the protrusion part disposed at a first side of the first end of the first biasing member and a first sidewall disposed at a second side of the first end of the first biasing member.

19. The reclining device according to claim 1, wherein a protrusion part separates a first hooking part and a second hooking part, the second hooking part being defined by the protrusion part disposed at a first side of the second end of the second biasing member and a second sidewall disposed at a second side of the second end of the second biasing member.

20. A reclining device, comprising:
a reclining mechanism, which is capable of tilting of a seat back relative to a seat cushion to be locked or unlocked;
a hinge pin, which is engaged with the reclining mechanism and is configured to cause the reclining mechanism to be in an unlocked state;
a first biasing member, a first end of the first biasing member is hooked to a hooking part provided at a seat-cushion-side member and a second end of the first biasing member is hooked to a seat-back-side member to bias the seat back in a direction in which the seat back is tilted forward toward the seat cushion; and
a second biasing member, one a first end of the second biasing member is engaged to a periphery of an engagement part formed at the hinge pin and a second end of the second biasing member is hooked to the seat-cushion-side member, and which is configured to bias the hinge pin in a direction in which there is no backlash between the hinge pin and the reclining mechanism,
wherein the first biasing member and the second biasing member are disposed to be separated from each other in an axial direction of the hinge pin, and
wherein a protrusion part is formed to separate a first hooking part, to which the first end of the first biasing member is hooked, and a second hooking part, to which the second end of the second biasing member is hooked, in the axial direction of the hinge pin, at the hooking part.

* * * * *